June 26, 1945. H. M. McCOY 2,378,938
MECHANISM AND CONTROLS FOR CONTROLLABLE AIRCRAFT PROPELLERS
Filed Nov. 18, 1942 6 Sheets-Sheet 1

INVENTOR
HOWARD M. McCOY
BY
ATTORNEYS

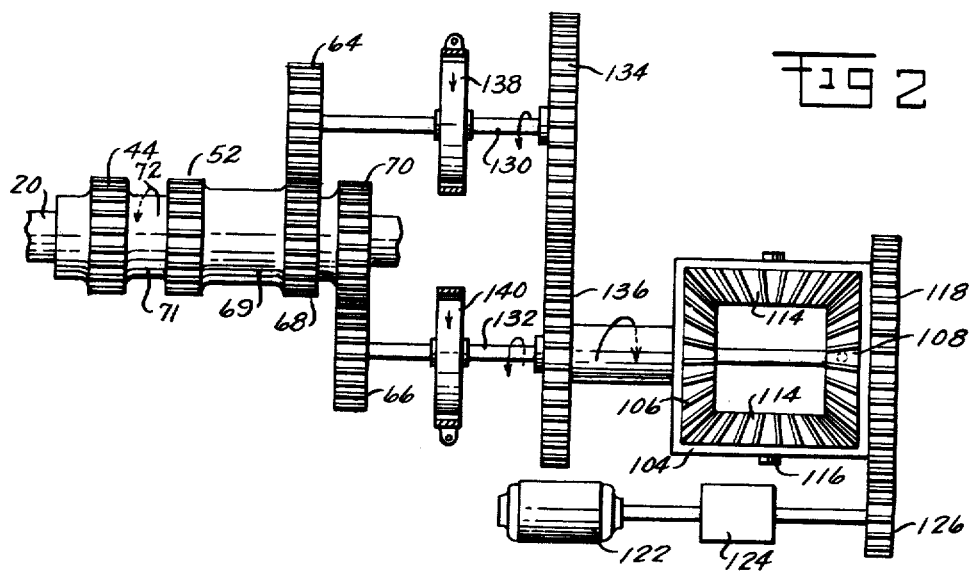
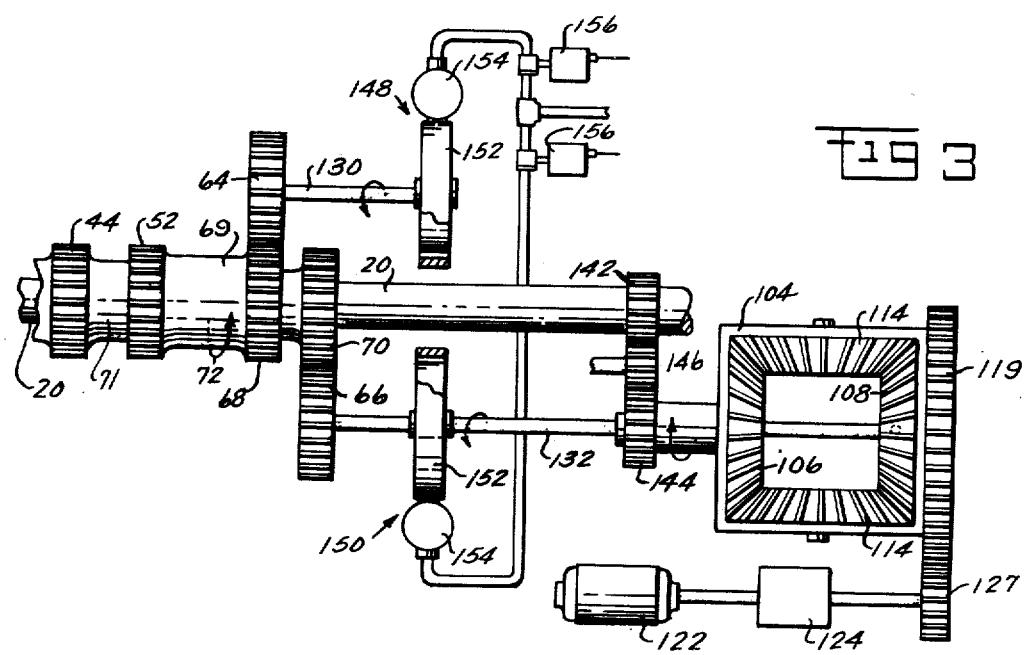

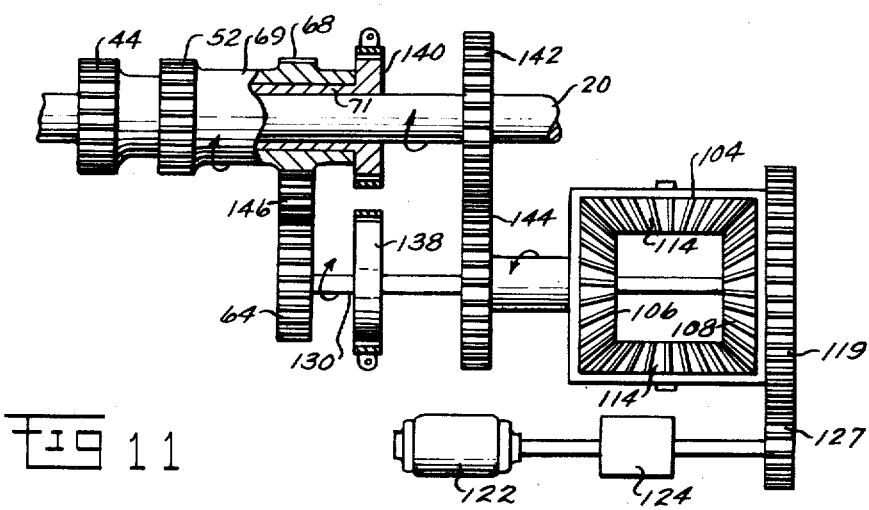
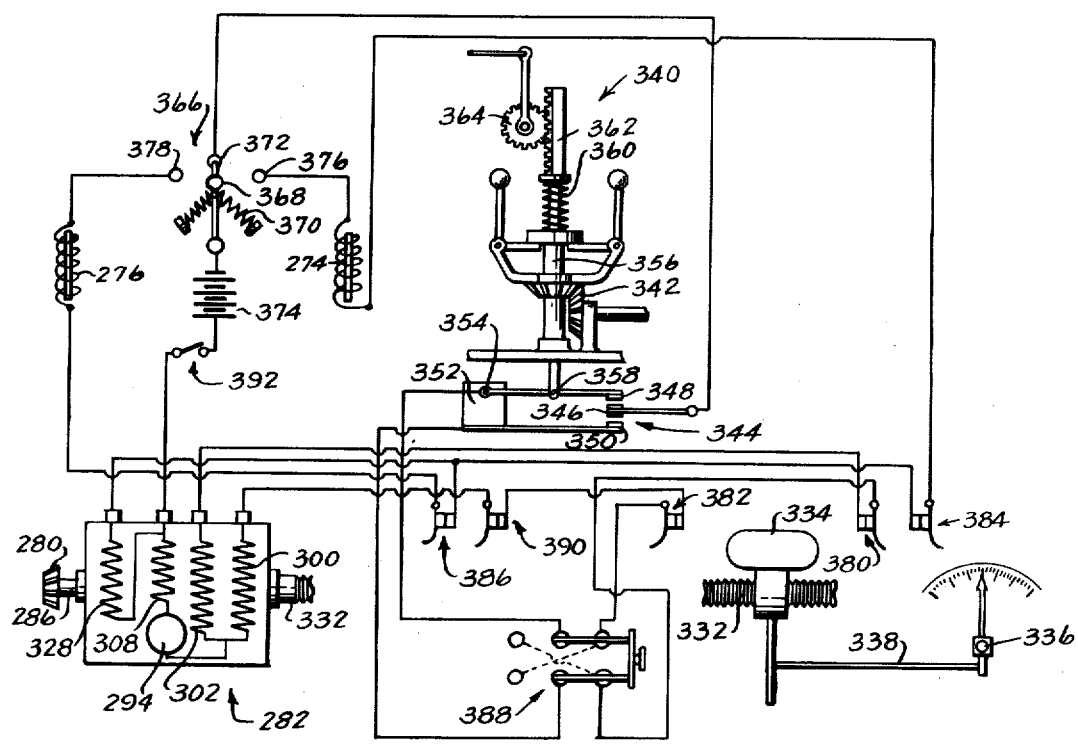

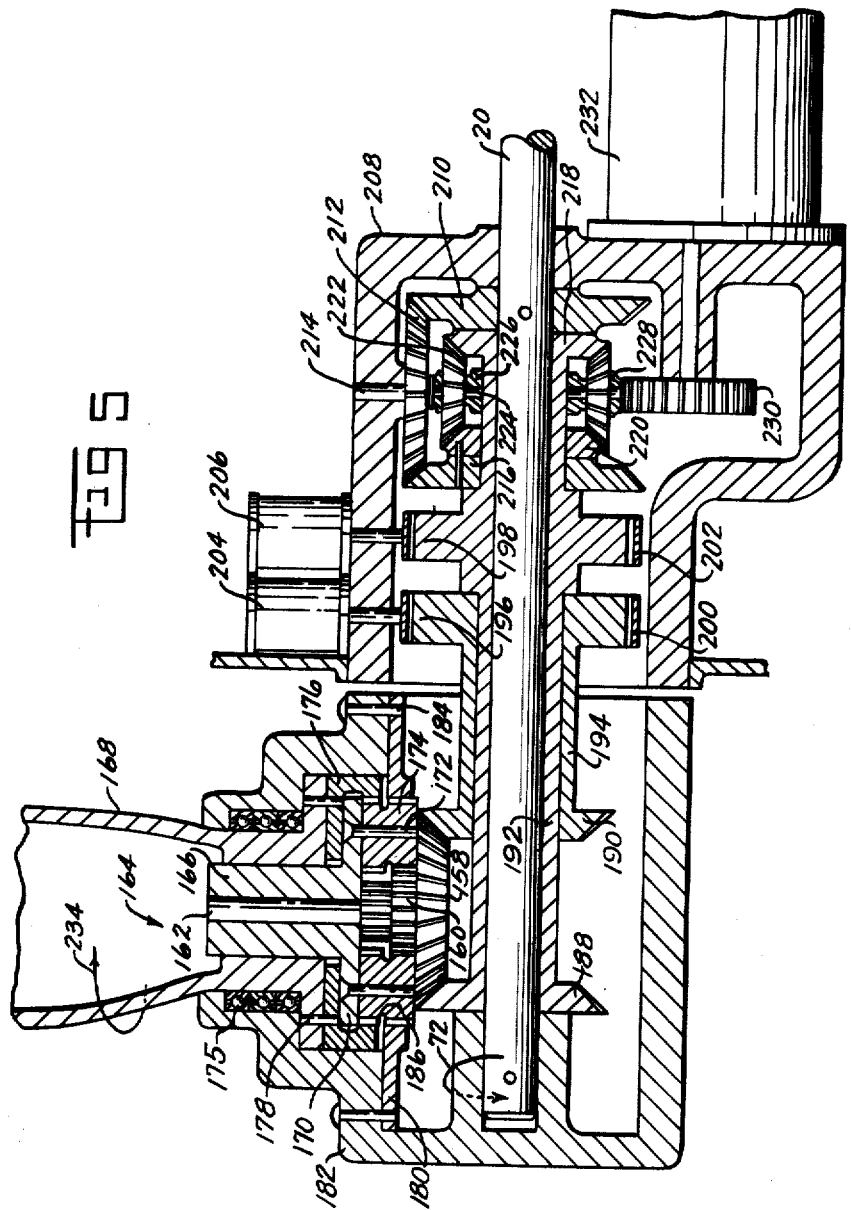

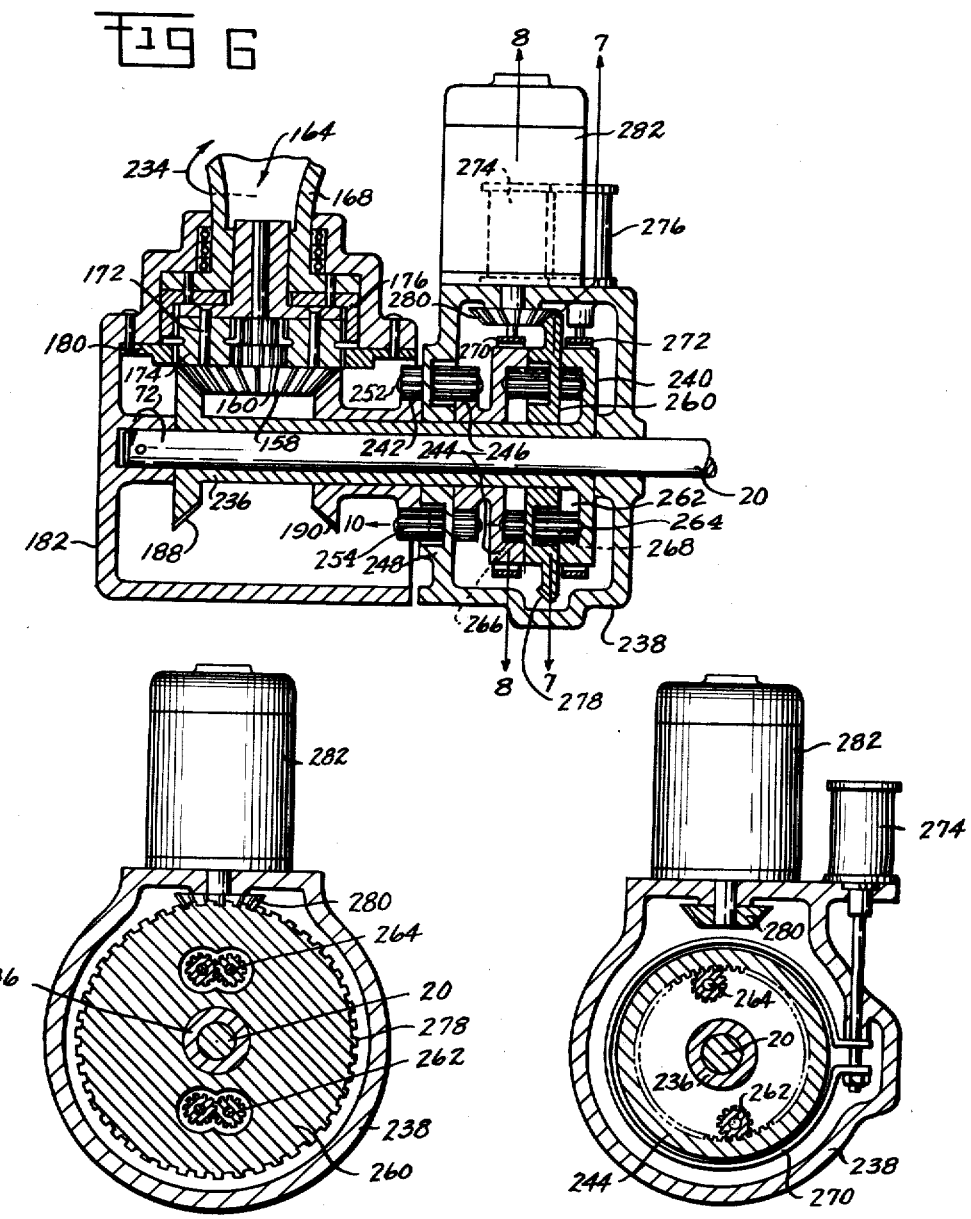

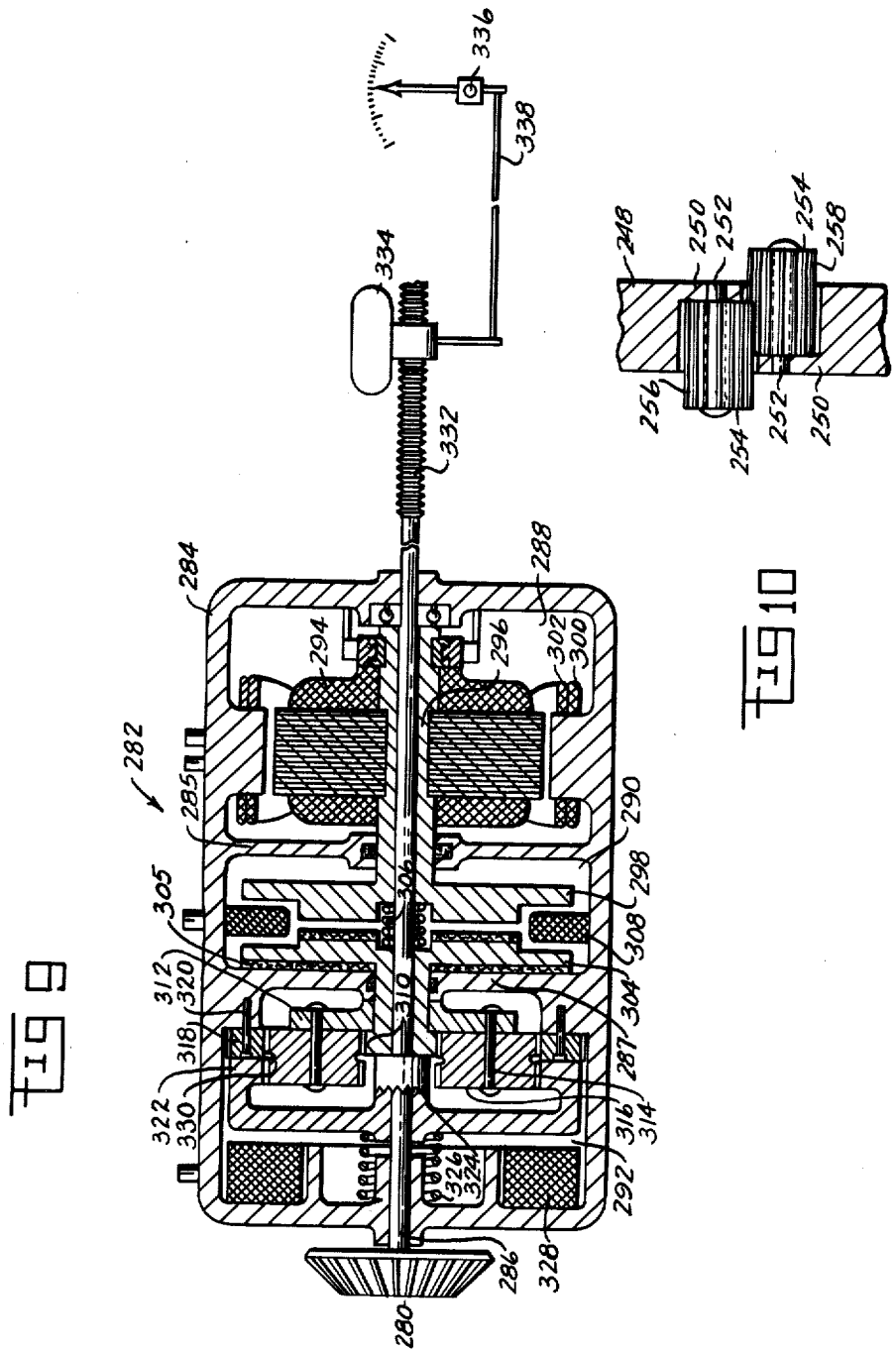

Patented June 26, 1945

2,378,938

UNITED STATES PATENT OFFICE 2,378,938

MECHANISM AND CONTROLS FOR CONTROLLABLE AIRCRAFT PROPELLERS

Howard M. McCoy, Patterson Field, Ohio

Application November 18, 1942, Serial No. 465,970

22 Claims. (Cl. 170—163)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to variable pitch propellers for aircraft, and particularly to mechanism whereby the pitch of the blades may be controlled either automatically or manually over a wide range, extending in one direction in the positive pitch range for full feathering and in the other direction in the negative pitch range for propeller braking.

Neither the idea of full feathering the propeller of a defective engine in a multiengined craft to minimize its drag and to stop a damaged engine, nor the idea of adjusting the propeller to a negative pitch angle for braking, is broadly new; yet, up to the present, no wholly satisfactory mechanism has been proposed which would operate to change the pitch rapidly enough for attaining the feathering and braking positions in a matter of one or two seconds, and still operate slowly and accurately enough to accomplish the microadjustments required to maintain a preselected propeller speed within one or two R. P. M., as is particularly required in multiengined craft.

Employment of gear mechanism whereby pitch change is accomplished by applying one or the other of a pair of brakes to rotate the propeller blades in one or the other direction for pitch increase or decrease is a well-known expedient, yet it is one of the most satisfactory ways known for effecting large pitch changes in minimum time, inasmuch as the considerable power required for these rapid pitch changes is derived from the source of propeller rotation, that is, from the engine of the craft, so that the matter of whether the engine loses slightly in R. P. M. due to the considerably increased load of rapid pitch change is of no great moment at the time these changes are being effected.

On the other hand, the micro-adjustments in blade pitch, necessary to correct off-speed conditions of one or two R. P. M., may be as small as one one-hundredth degree, and these had preferably be made without calling directly on the engine to supply the power for effecting the correction of its own speed, as, for instance, by means of a small electric or hydraulic motor with an unusually large gear reduction between the motor and propeller blade, the reduction preferably being somewhere between ten thousand and fifteen thousand to one. This motor-operated blade-adjusting mechanism has the further advantage that, unlike the braking system of blade adjustment, it will operate when the engine is stopped, whereby the blade pitch may be brought back to the take-off pitch angle from the negative braking pitch angle if that was not done, upon alighting, before the engine came to a full stop, or unfeathering may be accomplished on an engine stopped by feathering the propeller.

It is, therefore, an object of this invention to so connect and coordinate the two above-discussed systems of pitch adjustment that each may operate to do the adjusting for which it is best fitted, without disconnecting or otherwise affecting the other.

Other objects will be apparent from the following specification considered with respect to the drawings, wherein, Figure 1 is a schematic illustration of the device in its simplest form.

Figures 2, 3 and 4 are schematic illustrations of variants of the device shown in Figure 1.

Figure 5 is an axial section through a variable pitch propeller which embodies the principles of the invention.

Figures 6 through 10 show, in somewhat greater detail, a variant of the device shown in Figure 5.

Figure 11 shows a governing and control mechanism such as should preferably be provided for operating the device shown in Figures 6 through 10.

Like numerals refer to like parts throughout the drawings.

Figure 1:
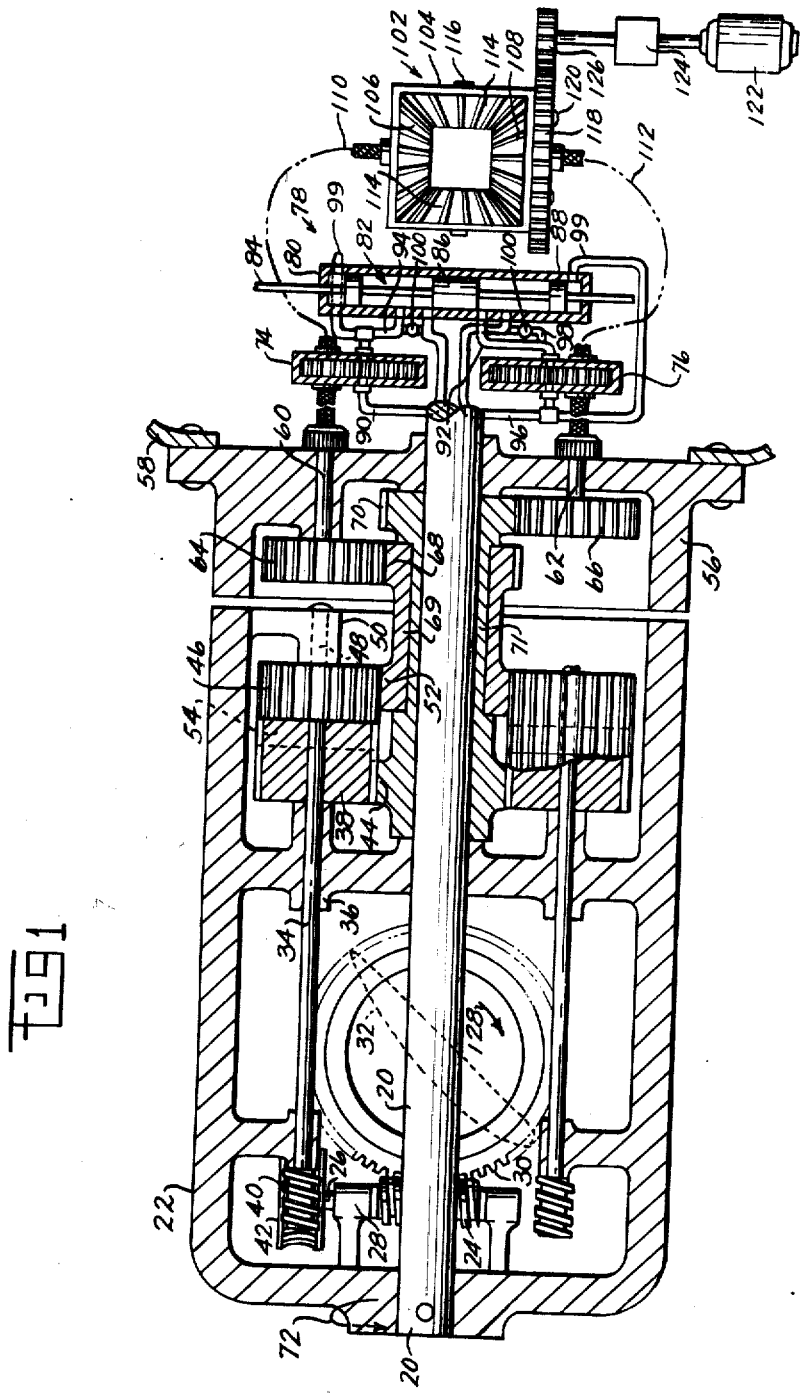

Referring to Figure 1, a propeller shaft 20 drives a propeller hub 22 which houses and provides bearings for the two-stage worm gearing. A worm 24, rotatable on a shaft 26, between bearing hubs 28, meshes with worm wheel 30 which is attached to the shank of the blade 32. A shaft 34, rotatable in bearings 36, at the rear end carries an elongated gear 38 and at the front end a worm 40. A worm wheel 42 is fast on the end of the shaft 26 and is in mesh with the worm 40.

The elongated gear 38 meshes with a narrower faced gear 44 which is freely rotatable on the shaft 20. A second elongated gear 46 rotates freely on a stud 48 supported in a boss 50 in the hub 22, the second elongated gear being meshed with the narrower gear 52. The faces of the elongated gears 38 and 46 overlap and mesh with each other at 54, whereby, if either of the narrower gears 44 or 52 rotates relative to the hub 22, the other narrower gear will rotate oppositely. Likewise, if gear 44 is held against rotation while the hub 22 is rotating, the worm 40 will be rotated on its own axis in the same direction as the hub, but if gear 52 is held against rotation while the hub 22 is rotating, the worm 40 will be rotated on its own axis in a direction opposite to that of the hub. Whether the pitch of the blade 32 is increased or decreased depends therefore on which of the two gears 44 or 52 is held or retarded. As long, however, as neither the gear 44 nor the gear 52 is held against rotation or retarded, the entire gear mechanism will revolve as a unit without changing the pitch of the propeller blades. The double reduction worm gearing 30, 24, 42, 40, the elongated pinions 38, 46, and the gears 44, 52, will hereinafter be called the pitch-change gear-set, the worm wheel 38 being the driven gear, the gears 44, 52, which control pitch change, will be called the control gears, and the other gears of the gear-set, the intermediate gears.

The means for retarding the control gears 44 and 52 includes a casing 56 secured, against rotation, to a nonrotating part 58 of the engine. Rotatably supported in the casing are shafts 60 and 62, carrying gears 64 and 66 respectively. Gear 64 meshes with a gear 68 which is joined for unitary rotation with the gear 52 by a sleeve 69, whereas gear 66 meshes with a gear 70 which is joined for unitary rotation with the gear 44 by a sleeve 71, whereby arresting or retarding the shafts 60 or 62, one at a time, will arrest or retard the control gears 52 or 44, and thereby respectively decrease or increase the pitch of the blade 32, assuming the worm 24 to be right-hand, the worm 40 left-hand, and rotation of the hub 22 in the direction of the arrow 72, and assuming that the ratio of the two gears 44—38 is 1 to 1, the worm wheel and worm 42—40 is 10 to 1, and the worm wheel and worm 30—24 is 14 to 1, the overall pitch change ratio will be 140 to 1. In order to facilitate description of the operation of the device of Figure 1, the gears 38, 44, 46, 52, 64, 66, 68, and 70 are herein all made the same in pitch diameter so that a 1 to 1 ratio exists between them. In actual practice these diameters may be varied to modify the overall ratios to any desired degree within reason.

A hydraulic braking means for arresting or retarding the shafts 60 or 62 comprises a pair of pumps 74 and 76 which are drivably connected to the shafts 60 and 62 respectively. Obviously, any restraining force which retards rotation of either pump 74 or 76 will retard rotation either of the control gear 52 or 44 to respectively decrease or increase the pitch of the blades 32.

The two pumps 74 and 76, the hydraulic circuits through which they pump, and the valve mechanism which controls the circuits are shown schematically only. The main control valve 78 comprises a valve casing 80 bored to slidably receive the valve plunger 82, which is made up of a rod 84, a long piston 86, and two short pistons 88, the pump discharge ports being connected by conduits 90 and 92, and the pump suction ports by conduits 94 and 96, to the valve casing within the space between the long and short pistons 86 and 88, whereby when the plunger is positioned centrally in the casing as shown, fluid circulates freely from the pump 74 through the conduit 90 along the stem 84 and back to the pump through conduit 94 and at the same time circulates freely from the pump 76 through conduit 92 along stem 84 and back through conduit 96.

As long as fluid may be circulated freely by the pumps 74 and 76, through their external circuits 90—94 and 92—96, no change in propeller pitch will take place. When, however, the valve plunger 82 moves longitudinally in the casing 80, one or the other of the pump discharge conduits will be restricted or closed, depending on the amount of movement, whereupon propeller pitch adjustment will take place. If, for instance, the plunger 82 is moved up to close the discharge conduit 90, the pump 74 will practically cease rotating, whereby the shaft 60, pinion 64 and gear 68 must also practically cease rotating, whereupon gear 46 rolls around the outer surface of the control gear 52 turning the gear 54, the shaft 34 and the worm 40 in the opposite direction to that which the propeller hub 22 is rotating; thus operating the left-hand worm and wheel 40—42 and the right-hand worm and wheel 24—30 to decrease the propeller pitch. Obviously, shifting the plunger 82 in the opposite direction will cause an increase in the propeller pitch. Any convenient means may be used for bringing the plunger 82 within the operator's reach for manual operation; electric solenoid or other remote means may be used or, it may be automatically controlled by centrifugal or like governing means. Small conduits 99 return any fluid which may leak past the pistons 88, to the suction conduits 94 and 96, thence to the suction sides of the pumps.

In order to avoid severe shock by too sudden a closing of the external circuit of one or the other of the pumps, the bypasses 98 and pressure relief valves 100 are provided. Valves 100 may preferably be spring loaded and adjusted to yield at a pressure somewhat in excess of that required to hold one of the gears 68 or 70 against rotation when turning the worm gearing for pitch increase or decrease.

The structure thus far described is included in my copending application Serial No. 458,587, filed September 16, 1942, the braking mechanism being shown in Figure 2, and the pitch change gearing in Figure 6 of that application. These mechanisms do not form a part of this invention except as used in combination with other features hereinafter described.

A differential gear-set 102 Figure 1, subject application, is contained in a cage 104 and includes a pair of bevel gears 106 and 108 which are driven by flexible shaft extensions 110 and 112, these extensions being continuations of or additions to, the shafts 60 and 62. Any suitable shafting or gear arrangement may be used in lieu or flexible shafts. Bevel idler pinions 114, rotatable on studs 116, are in constant mesh with gears 106 and 108. A relatively large gear 118 is affixed to the cage 104 by screws 120. The cage 104 itself is the differential pinion carrier for the gear-set. A differential gear-set in some form is required as a part of each of the several modifications of the invention hereinafter described.

The power unit for rotating the carrier 104 consists of a small electric motor 122 which is arranged to drive the gear 118 through a speed-reducing gear box 124 and a pinion 126. The gear-set in the box 124 may preferably have a ratio of about 140 to 1, and the ratio between the gear and pinion 118—126 may preferably be about 1½ to 1. The box 124 should also contain a spring-engaged brake for holding the pinion 126 nonrotative when no pitch change is desired, and an electrically engaged, spring-disengaged clutch for connecting the motor 122 and pinion 126 only when electric current is applied to operate the motor. A cross section of a small motor with an inbuilt gear box and the necessary clutch and brake mechanism is shown in Figure 9 and is hereinafter described. A wiring diagram showing the necessary connections to the motor and to the electrically operated clutch and brake mechanism, together with a series of manually and automatically operated switches for controlling the applied current is shown in Figure 11. The structure and operation of the mechanism of Figures 9 and 11 will be hereinafter discussed in detail. The operation of the mechanism shown in Figure 1 is as follows:

Let us suppose, for illustration, that the operator desires to shift from the take-off pitch to full feathering, which may represent a pitch change of approximately seventy-five degrees. He will move the plunger 82 in the proper direction to close the discharge conduit 92 of the pump 76. This will cause the pinion 66 and gears 70—44 to substantially cease rotation, whereupon the wide gear 38 will roll around the control gear 44, rotating the shaft 34 in the same direction and at the same speed as the propeller. Assuming a propeller speed of 1120 R. P. M., the 140 to 1 worm reduction will change the pitch angle at a rate of $1120/140 = 8$ R. P. M. or at the rate of $8 \times 360$ degrees=2880 degrees per minute=48 degrees per second. The shift to full feathering will therefore be accomplished in somewhat under two seconds.

In shifting from the cruising range to a negative pitch angle for propeller braking, movement of the plunger 82 upward to close the discharge conduit 90 of the pump 74 will effect this change in approximately the same time as for full feathering, that is, somewhat less than two seconds.

The foregoing use of the pumps 74—76 takes care of the grosser pitch change increments or decrements which are required to take place in minimum time when full feathering or braking is being effected. The pumps 74—76 are, however, operative in this capacity only while the propeller is rotating, and conditions may arise when large pitch changes may advantageously be made by use of the motor 122. As an example of such an instance, assume that the propeller has been left in the braking position and the engine stopped, and it is desired to use the electric motor 122 to obtain the proper pitch angle for take-off. To accomplish this change, the blade 32 may be rotated clockwise, that is, in the direction of the arrow 128; a matter of about 40 degrees.

The shaft 34 must therefore be rotated in the direction of the arrow 72 a matter of about $40/360 \times 140 = 15.55$ turns. Since the gears 38, 44, 46, 52, 64, 68, 70, 66, are all of the same size and all in mesh one with the next, it is readily found by tracing the directions and degree of rotation that these gears take, when the shaft 34 is rotated the required 15.55 turns, that the bevel gears 106 and 108 must also both rotate 15.55 turns and that the direction of both is anticlockwise, viewed from the end of cage 104 to which gear 118 is attached. With a ratio of 140 to 1 in the gear box 124, and a ratio of 1½ to 1 between the gear 118 and pinion 126, the 15.55 turns of the cage 104 will be accomplished by about 3266 clockwise turns of the motor. By employing a motor having a normal speed of 7350 R. P. M. the relatively large pitch change of 40 degrees is accomplished by means of the motor 122 in $3250/7350$ minutes or about 27 seconds. Stated in another way, the motor 122 is rotated 3266 turns clockwise, which, through the 210-to-1 reduction provided by the gear box 124 and the pinion 126, causes the gear 118, cage 104 and bevel gears 106 and 108 to rotate $3266/210 = 15.55$ turns anticlockwise, all viewed from that end of the motor 122 which is opposite the end from which the motor shaft emerges. This causes gear 64 to rotate anticlockwise and gear 66 clockwise 15.55 turns viewed from the cage 104. Viewed also from the cage 104, the gears 68, 52 and 38 must rotate clockwise and the gears 70, 44 and 46 anticlockwise 15.55 turns. The 15.55 clockwise turns of the shaft 34, operating through the 140-to-1 worm gear reduction, will rotate the blade $15.55/140$ or 1/9 turn which amounts to 40 degrees of pitch increase.

The micro-adjustments which are required to accurately maintain a constant propeller speed while cruising are also accomplished by the use of the electric motor 122, while the pumps are running idle. For illustration, let it be assumed that the propeller has an on-speed rotation of 1120 R. P. M., and that it has gone overspeed to an extent which requires an increase in the pitch angle of $2^4/7$ degrees, and that it is desired to make this change in the pitch angle at a rate of 1½ degrees per second, which requires a total time of $1^5/7$ seconds. If the normal propeller rotation speed is 1120 R. P. M., then there will be 32 turns in $1^5/7$ seconds.

Since the gear ratio between the shaft 34 and blade 32 is 140 to 1, a change of $2^4/7$ degrees in the pitch angle of the blade 32 in the direction of the arrow 128 will require a rotation of $140 \times 2^4/7 = 360°$ rotation or one turn of the shaft 34 clockwise with respect to the hub 22, clockwise being in the direction indicated by the arrow 72. This one turn of the shaft 34 and gear 38, clockwise with respect to the hub 22, rotates the gears 44 and 70 one turn anticlockwise with respect to the hub 22, but since the hub 22 has, in the same period of time, rotated 32 turns clockwise with respect to the stationary housing 56, the gears 44 and 70 will have rotated only 31 turns clockwise with respect to the stationary housing 56.

So also this one turn of the shaft 34 and gear 38, clockwise with respect to the hub 22, rotates the idler 46 one turn anticlockwise and the gears 52 and 68 one turn clockwise with respect to the hub 22, but since the hub 22 has, in the same period of time, rotated 32 turns clockwise with respect to the stationary housing 56, the gears 52 and 68 will have rotated 33 turns clockwise with respect to the stationary housing 56. The gears 64 and 66 will therefore have rotated 33 and 31 turns respectively, both anticlockwise with respect to the stationary housing 56, while the shaft 34 rotates one turn clockwise on its own axis and is bodily revolved about the axis of the hub 22 clockwise 32 turns. Bevel gear 108 will therefore rotate clockwise 31 turns and beveled gear 106 anticlockwise 33 turns, both viewed from the end of the cage 104 to which the gear 118 is attached. This can be accomplished only if the cage 104 rotates through one turn anticlockwise in the same period of time.

The ratio between the motor 122 and the carrier 104 being 210 to 1, the motor must revolve two hundred ten revolutions clockwise. Since its normal speed is 7350 R. P. M. it will revolve the two hundred ten revolutions in $210/7350 \times 60 = 1.7$ seconds. An increase of $2^4/7$ degrees in 1.7 seconds is equal to an increase of approximately 1½ degrees per second. Decrease of the pitch angle at the same rate may be accomplished by rotating the motor anticlockwise.

In the schematic view Figure 1, the flexible shafts 110 and 112 are employed for the reason that, with such an arrangement, the two gears 84 and 66 which rotate at the same speed and in the same direction, as long as the control gears 44 and 52 both rotate in unison with the propeller, will drive the two bevel gears 106 and 108, to which they are attached, at the same speed but in opposite directions. The flexible shafts and the manner in which they are attached constitute a reversing means which is present in one form or another in all of the modifications hereinafter described. These reversing means must in some manner function to take power off the control gears while they rotate in the same direction as the propeller hub and transmit it to the two differential gears so as to rotate one of them in a direction opposite the other. The use of flexible shafts may, for example, be avoided by an arrangement as shown in Figure 2, where the flexible shafts 110 and 112 are replaced by gid shafts 130 and 132, and a pair of gears 134 and 136 are added, gear 134 being drivably connected to the shaft 130, and gear 136 to the hub of the gear 106. Gear 108 is runningly fitted to the shaft 132, while gear 108 is drivably secured thereto. The two brakes 138 and 140 are band brakes instead of hydraulics as in Figure 1, but the hydraulic brakes may be used if desired. In Figure 2, the gears 134—136 constitute the reversing means. Other parts of the structure are the same as in Figure 1. The arrows of rotation show that the same results are accomplished.

Figure 3 shows another arrangement for accomplishing substantially the same result as that of Figure 1 but with the flexible shaft of Figure 1 omitted. In this variant, reversal of the bevel gear 108 is effected by taking directly off the propeller shaft 20 with a pair of gears 142 and 144, and an idler gear 146 between, to provide the right direction of rotation, these gears and pinion constituting the reversing gear-set for this modification. The bevel gear 108 is drivably secured to the shaft 132, while the bevel gear 106 has its hub freely rotatable on the shaft 132 but drivably secured to the gear 144. Brakes 148 and 150 are here shown as friction brakes consisting of bands 152 which may be drawn up by hydraulic cylinders 154 which are in turn controlled by solenoid operated valves 156. This device is only half as sensitive for micro-adjustments as those shown in Figures 1 and 2 because, when taking the drive for one of the bevel differential gears off the propeller shaft, each turn of the carrier 104 effects twice the change in blade angle as in the arrangements of Figures 1 and 2. This may, however, be compensated for by providing a 3 to 1 ratio between the pinion 127 and gear 119 instead of the 1½ to 1 ratio of the pinion 126 and gear 118 of Figure 1.

In the modification Figure 4, the gear 70 which is on the sleeve 71 in Figure 1, and is used to arrest or retard the control gear 44 of Figure 1, is eliminated, and a brake 140 put in its place on the sleeve 71. The gear 64 then drives the shaft 130 through which the bevel gear 108 is driven, the other bevel gear 106 having a long hub to which the gear 144 is attached. Gear 84 is driven through the idler pinion 146 by the gear 68 which is fast on the control gear 52. A second brake 138 is fast on the shaft 130. The remainder of the construction and operation are the same as described relative to Figure 3.

In Figure 5 a somewhat different type of gearing is employed to carry out the principle of the invention. A miter driving gear 158, a sun gear 160 and a shaft 162 are secured together to rotate as one. A planet pinion carrier 164 comprises a hub 166 which has rotative bearing on the root of a propeller blade 168, a flange 170 at the lower end of the hub and studs 172 depending from the flange. The shaft 162 is concentrically supported for rotation in the hub 166. A series of planet pinions 174 are rotatable on the studs 172 and are thereby held in constant mesh with the sun gear 160.

An inwardly flanged internal ring gear 176 is secured to an outwardly extending flange on the blade 168 by pins 178 whereby the blade 168 and gear 176 rotate as one on the bearings 175, the gear 176 being the driven gear of the gear-set. A second internal ring gear 180 is nonrotatably secured in the propeller hub 182 by screws 184, the gear 180 being the reaction gear of the planetary gear-set. The planet pinions 174 have a face width as wide as the two internal gears 176 and 180 together, and have a peripheral groove 186 dividing their face into two parts. The sun gear 160 has a face width which engages only the lower one of these parts.

If the sun gear is provided with twelve teeth, the planets with twelve teeth each, and the lower ring gear 180 with thirty-six teeth, the carrier rotations will be $$\frac{S}{R+S}=\frac{12}{36+12}=\frac{1}{4} \text{ the sun gear rotations}$$

If the upper ring gear 176 is provided with thirty-five teeth, the blade rotation will be $\frac{1}{35} \times \frac{1}{4} = \frac{1}{140}$ the sun gear rotations but in the opposite direction. If four pinions 174 are equally spaced around the carrier flange 170, only the first will have the teeth of the upper and lower half in alignment. The second, third, and fourth will respectively have the teeth of the upper half in advance of the lower half ¼, ½, and ¾ of the circular pitch. In designing for other ratios than that above suggested, it should be noted that the lower ring gear 180 and the sun gear 160 should both have a number of teeth which is divisible by the number of equally spaced planets on the carrier, or the number of teeth on both may be divisible by half the number of pinions on the carrier if neither is divisible by the whole number of pinions on the carrier.

In mesh with the miter driving gear 158 are two miter control gears 188 and 190, the first being on the long sleeve 192 which is freely rotatable on the propeller shaft 20, and the second on a shorter sleeve 194 which is freely rotatable on the long sleeve 192. The short sleeve 194 carries the brake drum 196, the longer sleeve 192 being provided with a similar brake drum 198. Friction bands 200 and 202 are arranged to be applied to the drums 196 and 198 by fluid pressure means 204 and 206, which are mounted on the stationary housing 208. The assembly of the spur gears 176, 180 and 160, spur pinions 174 and carrier 164, and the miter gears 158, 188, and 190, constitute the pitch-change gear-set of which the ring gear 176 is the driven gear and the miter gears 188 and 190 are the control gears. A reversing gear-set which takes the place of the flexible shafts 110 and 112 of Figure 1, comprises a bevel gear 210 fast on the shaft 20, a bevel gear 212 rotatable on a short shaft 214 in the housing 208 and a bevel gear 216 rotatable freely on the long sleeve 192, the three bevel gears being in mesh one with the other.

A differential gear-set comprises a bevel gear 218 fast on the long sleeve 192, a bevel gear 220 pinned to the reversing gear 216 for unitary rotation therewith, and bevel pinions 222 rotatable on studs 224. Studs 224 are circumferentially spaced apart in a pinion carrier 226 which is freely rotatable on the long sleeve 192. A differential drive gear 228 is fast on the outside of the carrier 226. A motor pinion 230 is in constant mesh with the gear 228. The ratio of the pinion 230 to the gear 228 is preferably about 3 to 1.

The electric power unit 232 should have an inbuilt clutch and brake mechanism and a speed-reducing gear set similar to that called for in the discussion of Figure 1. The arrow 72 on the front end of the propeller hub indicates the preferred direction of rotation. The operation of the device shown in Figure 5 is as follows:

Let us assume, for illustration, a propeller R. P. M. of 1120 in the direction of the arrow 72. If the brake drum 196 is now held against rotation, the miter gear 190 stops and the miter gear 158 rolls around it, thereby rotating on its shaft 162 in a direction opposite to that of the arrow 234 and at the same R. P. M. as the propeller. Since the ratio between the gear 158 and the blade 168 is 140 to 1, the blade will be turned on its axis $^{1120}/_{140}$=8 R. P. M.=2880 degrees per minute or 48 degrees per second in the direction of the arrow 234, which is the direction for increasing the pitch. Arresting rotation of the brake drum 198 decreases the pitch at the same rate.

Changing the blade angle when the propeller is not rotating is accomplished by the motor 232. In this case the propeller hub 182, shaft 20, bevel gears 210, 212, 216, and 220, are nonrotative. When the carrier 226 is now rotated by means of the motor in the direction of the arrow 72, the bevel pinions 222 will roll around the nonrotative bevel gear 220 and will rotate the bevel gear 218, sleeve 192, and miter gears 188 and 158 at twice the speed of the carrier 226. If the motor has an inbuilt reduction gear-set of 140 to 1, the motor pinion 230 to the carrier gear 228 a ratio of 3 to 1, and the pitch-change gear-set a ratio of 140 to 1, the motor armature will rotate 29,400 turns to 1 of the blade. Forty degrees or $^1/_9$ of a blade rotation would require 3266 motor revolutions. A motor having a normal speed of 7350 would therefore require about 27 seconds to move the propeller blade through forty degrees change in pitch angle when the propeller was nonrotative.

As to making the micro-adjustments necessary for uniform propeller rotation, let us assume, for illustration, that the propeller has gone off its normal speed to an extent which will require an increase in the pitch angle of 2 4/7 degrees, and that it is desired to make this change in the pitch angle at a rate of 1½ degrees per second or in a total time of 1 5/7 seconds.

Since the gear ratio between the sleeve 192 and the blade 168 is 140 to 1, a change of 2 4/7 degrees in the pitch angle of the blade 168 in the direction of the arrow 234 will require a rotation of 140×2 4/7=360 degrees, or one complete turn, which the sleeve 192 must gain on the hub 182 to effect this change.

If normal propeller rotation is 1120 R. P. M., then there will be 32 turns in 1 5/7 seconds. The shaft 20, gears 210, 212, 216, and 220, therefore make 32 turns. To effect that pitch change the gear 218 therefore must rotate 33 turns in the direction of the arrow 72, while the gear 220 rotates 32 turns oppositely. Since it is a condition of a non-rotating carrier 226 that gears 218 and 220 rotate oppositely at the same speed, it will be seen that when the gear 218 rotates an additional turn, the carrier 226 must rotate one-half of a turn in the direction of the arrow 72.

Since this half-turn is to be accomplished in 1 5/7 seconds, the carrier must rotate at the rate of 17½ R. P. M., the pinion 230 must rotate 3×17½=52½ R. P. M. and the motor armature will rotate 140×52½=7350 R. P. M. To effect the desired pitch increase, the motor armature rotates at this speed for 1 5/7 seconds, in which time it must make two hundred turns. If the same type gearing is used in the motor gear-set as in the blade gear-set, the motor will rotate clockwise to increase the propeller pitch. Anti-clockwise rotation of the motor will decrease the pitch at the same rate.

Figures 6 through 11 show a specific exemplification of the invention together with the electric motor structure and its manual and automatic controls.

Referring to Figure 6, the propeller hub 182, blade 168, gears 176, 180, and 160, pinions 174 and their pinion carrier 164, and the miter gears 158, 188, and 190, are, both as to construction and operation, exactly like corresponding parts of the structure of Figure 5 heretofore described and referred to as the pitch-change gear-set, the miter gears 188 and 190 being, as before, the control gears. The reversing gear-set and the differential gear-set, however, both differ from the structure of Figure 5 in several material respects.

In Figure 6, the miter control gear 188 is fast on a long sleeve 236 which is freely rotatable on the shaft 20. Sleeve 236 extends rearwardly into the nonrotatable housing 238, and at the rear end has fast thereon a brake drum 240.

The other miter control gear 190 has a hub upon the rear end of which are formed the teeth of a spur gear 242. A second brake drum 244 is axially spaced apart from the brake drum 240 within the housing 238. Drum 244 has a hub upon the forward end of which are formed the teeth of a spur gear 246 which may preferably, although not necessarily, be of the same diameter as the gear 242.

The forward wall 248 of the housing 238 is thicker than the other walls, occupying the entire space between the gears 242 and 246 and providing, at its central part, a bearing for the long sleeve 236. Pairs of cup-shaped openings (see Figure 10) are formed in opposite sides of the wall 248, but do not extend all the way through it, thereby leaving a thin portion 250 in which the studs 252 have their ends anchored. Reversing pinions 254 are freely rotatable on the studs 252, the studs being so spaced and positioned that the inner ends of the pinions overlap and are in mesh one with the other, and the outer ends 256 and 258 which extend oppositely from the wall 248 are in mesh with the gears 242 and 246 respectively (see Figure 6), whereby rotation of the gear 242 in one direction rotates the gear 246 in the opposite direction. Gears 242 and 246 and pinions 254 may collectively be referred to as the reversing gear-set which, in some form or other is present in all of the modifications herein shown. As long as there is no pitch change taking place, the miter control gears 188 and 190 both rotate at the same speed and both in the direction of the arrow 72, whereby the brake drum 240 rotates in the direction of the arrow 72 but due to the reversing gear-set the brake drum 244 rotates in the opposite direction.

The space between the brake drums 240 and 244 is occupied by a relatively thick disc 260 which also has pockets formed in opposite sides of the disc and pairs of pinions 262 rotatable on studs 264 anchored in the bottoms of the pockets in the same manner as was described relative to Figure 10, where the inner ends of the pinions overlap and mesh one with the other and the outer ends extend beyond the disc.

The oppositely extending ends of the pinions 262, however, mesh with a pair of internal gears 266 and 268 which are formed on the inside of the drums 244 and 240 respectively. Inasmuch as the reversing pinions 254—256 cause drums 240 and 244 to rotate oppositely at the same speed, as long as no pitch change is being effected, the pinions 262, by meshing with the oppositely rotating internal gears 266—268, will cause the disc 260 to remain nonrotative as long as the no-pitch-change condition prevails. The internal gears 266—268, the pinions 262, and the disc 260 comprise a spur differential gear-set which functions exactly like the bevel differential gear-sets in Figures 1 through 5, the parts 266—268—262—260 of this spur differential corresponding respectively to parts 106—108—114—104 of the bevel differential shown in these views, and while it is indicated that the pitch-changing gear-sets which are to be used in Figures 2, 3, and 4 are, like Figure 1, of the worm-gear type, and those used in Figures 5 and 6 are of the planetary type, it will of course be understood that the principles of the invention will be carried out if the worm pitch-change gears of Figure 1 are used with the differential gearing of Figure 5 or 6 and if the planetary pitch-change gearing of Figure 5 or 6 are combined with the differential gearing of Figures 1 through 4. In Figures 1 through 4, the control gears are 44 and 52, while in Figures 5 and 6, the control gears are 188 and 190. To adapt Figures 2, 3, and 4 to receive the planetary pitch-change gear-set, the spur control gears 44—52 should be exchanged for the bevel control gears 188—190.

Brake bands 270 and 272 are arranged to be applied with solenoids 274 and 276 to respectively arrest or retard the drums 244 and 240. A bevel gear 278 is formed on the periphery of the disc 260, this gear being in mesh with the bevel pinion 280 of the motor 282. The speed ratio between the pinion and gear 280—278 may preferably be 3¹⁄₁₀ to 1. The motor may be secured to the housing 238 by any convenient means. The construction of the motor is shown in Figure 9.

The motor housing 284 has bearings in the end walls for the low-speed motor shaft 286 to the forward end of which the bevel pinion 280 is secured. The motor housing 284 is divided by partitions 285 and 287 into three compartments: a motor compartment 288, a clutch and brake compartment 290, and a gear compartment 292.

The armature 294 is built on a sleeve 296 which is freely rotatable on the shaft 286 and at its forward end carries the clutch disc 298. To simplify reversing of the motor, two sets of oppositely wound field coils 300 and 302 are used, although the conventional method of reversing the direction of the armature current as is the more common practice may be followed.

A clutch-and-brake disc 304 faced with friction material 305 is held against the partition wall 287 by the expansion spring 306. A coil 308 is fixed in the compartment 290 and adapted, upon energization, to draw the disc 304 away from the wall 287 and against the clutch disc 298. The hub of the disc 304 extends through the wall 287 into the gear compartment 292, the teeth of a sun gear 310 being formed on the forward end of the hub.

A planet pinion carrier 312 is freely rotatable on the hub of the disc 304 and carries the studs 314 upon which the planet pinions 316 rotate freely, the pinions being in constant mesh with the sun gear 310. A ring gear 318 is held against rotation in the compartment 292 by the screws 320. Ring gear 318 is in constant mesh with the planet pinions 316. A second ring gear 322, which is also in constant mesh with the planet pinions 316, is drivably connected to the shaft 286 through a jaw clutch 324, the intermeshing teeth of which are formed on the rear end of the hub of the gear 322 and the forward end of an enlargement of the shaft 286. The intermeshing teeth of the clutch 324 are held in engagement by a spring 326. A coil 328 held in the end of the compartment 292, when electrically energized, draws the gear 322 forwardly against the resistance of the spring 326 whereby the teeth of the clutch 324 are disengaged and the shaft 286 may be turned freely by the pinion 280 without turning any other part of the motor.

The planet pinions 316 each have their relatively wide faces divided into two parts by a groove 330, the sun gear 310 and the ring gear 318 being meshed with one of these parts while the ring gear 322 only is meshed with the other of said parts. The sun gear 310 has twelve teeth, the planet pinions 316 each have twelve teeth, the ring gear 318 has thirty-six teeth and the ring gear 322 has thirty-four teeth which provides a ratio through the motor gear-set of 68 to 1. It should be noted that if, in this gear-set, only two planet pinions are used, the teeth on the two portions of the pinion will be in alignment but if four are used, two of them will have the teeth on one part half the circular pitch out of alignment with the teeth on the other part. In designing for other ratios it may be useful to remember that if the number of teeth by which the stationary ring gear 318 differs from the rotatable ring gear 322 is the same as the number of planet pinions 316, and the teeth of both the sun gear 310 and ring gears 318—322 are divisible by the number of planet pinions, or by half the number of planet pinions if the teeth of neither the sun or ring gears are divisible by the whole number of planet pinions, then the planet pinions may all be exactly alike and all have the teeth extending uniformly across their wide face, in which case the groove 330 is unnecessary and the sun gear may have as wide a face as the planet pinions or as wide as the two ring gears taken together.

Since the rotation of the shaft 286 is a function of the pitch change, it is prolonged at the rear end and screw-threaded as at 332 for the internally threaded carriage 334 which moves along the screw as it rotates in one or the other direction to operate the pitch indicator 336 through a "Bowden" wire 338 or other similar means. Since the degree of pitch change is preferably kept within predetermined limits, the carriage 334 is also employed to operate a series of switches which function to limit the change in pitch angle by breaking the electric circuits. The electric switches and other control means are shown in Figure 11.

Referring to Figure 11, a centrifugal governor 340, which may be driven by the engine or propeller shaft through the gearing 342, operates an electric switch 344, which consists of a stationary contact member 346 and two contact members 348 and 350 which are insulatedly spaced on the block 352, the block being pivoted at 354.

The stem 356 of the governor is attached to the switch at 358, whereby, when an overspeed condition prevails, the contact member 350 engages the contact member 346 for pitch increase, and when an underspeed condition prevails, the contact member 348 will engage the contact member 346 for pitch decrease. A spring 360 is adjustable by a rack 362 and pinion 364 to vary the R. P. M. at which the switch 344 is actuated to increase or decrease the pitch.

A manually operable switch 366 has a bar 368 which is constrained by the springs 370 to remain in contact with the middle contact member 372 through which a source 374 supplies current to the automatic contact member 346. The bar 368 may, however, be manually held in engagement with the contact members 376 or 378 for energizing the solenoid 274 or 276, whereby the brake bands 270 or 272 are applied to effect large increments of pitch change as for feathering or braking. Since either the full feathering or the braking position may be accomplished in a matter of about two seconds, no means is provided for preventing the springs 370 returning the bar 368 to the middle or automatic position when it is released.

The limit switches 380 and 382 are so positioned as to be opened by the carriage 334 when the automatic switch has respectively increased the cruising pitch to about 55 degrees or decreased it to the take-off pitch angle, which is about 15 degrees. The limit switches 384 and 386 are so positioned as to be opened respectively by the carriage 334 at the full feathering position, which may be about plus 87 degrees, and at the maximum braking position, which may be about minus 30 degrees, should the switch bar 368 be held on the contacts 376 or 378 for more than the several seconds required to reach these positions.

A snap-action reversing switch 388 is provided and so positioned that just before the carriage 334 passes an arbitrary low or negative pitch angle, the switch is operated, whereby the connection between the governor contact member 348 and motor winding portion 300 and the connection between the governor contact member 350 and motor winding portion 302 are reversed, whereby the governor 340 becomes operative to maintain the selected constant propeller speed in the negative range as when braking. Under this reversed condition the movement of the carriage 334 to the left, which before represented pitch decrease, now represents negative pitch increase, and the indicator 336 should have graduations to correspond. A limit switch 390 is provided and so positioned as to limit the negative pitch increase which may be effected by the automatic governor to a matter of about minus 25 degrees. A manually operable switch 392 may be opened to render the entire electrical system inoperative.

With electrical conductors connecting the several parts as shown in Figure 11, the operation of the mechanism shown in Figures 6 through 11 will be substantially as follows:

Let us assume, for illustration, that the switch 392 is closed, the propeller is rotating 1120 R. P. M. in the direction of the arrow 72, and it is desired to full feather. The switch bar 368 is held on the contact member 376 a matter of several seconds. In this time the solenoid 274 will have applied the brake band 270, the coil 328 will have disconnected the gear 322 from the motor shaft 286, thus leaving the shaft 286 free to rotate and operate the carriage 334 without having to rotate the motor through the motor gear-set, which, when driven from the shaft 286 would otherwise become a high ratio pitch-increasing gear-set, while the miter control gear 190, by remaining nonrotative, will have caused the miter gear 160 to roll around it a matter of about sixty-two turns, which will have rotated the propeller blade in the direction of the arrow 234 a matter of about 85 degrees. In this full-feathered position the carriage 334 will open the limit switch 384, the indicator 336 showing the full-feathered position. If this full-feathered position is to be maintained, the switch 392 may be opened, after which the bar 368 may be released.

Assume now that it is desired to effect propeller braking. The switch bar 368 is held on the contact member 378 a matter of several seconds. The solenoid 276 (see Figure 6) applies the brake band 272, the coil 328 frees the shaft 286 from the motor gear-set, while the miter control gear 188, by remaining nonrotative, causes the miter gear 160 to roll around it, which will rotate the propeller blade in a direction opposite the arrow 234, and will rotate the shaft 286 Figure 9 to operate the carriage 334. Carriage 334 will operate the reversing switch 388 just before the blade passes the arbitrary low or negative pitch angle, then will continue to the left until the limit switch 386 opens the circuit. If it is desired to maintain this braking pitch, the switch 392 should be opened before the bar 368 is released. If, however, the switch 392 is left closed, and the switch bar 368 is released, the automatic governor 340 will function to maintain the propeller blades at such pitch angle as will keep the propeller on speed during the entire braking period. Holding the bar 368 on the contact member 376 for one or two seconds will bring the blades back into the positive pitch range, and set the reversing switch to normal.

As long as the switch 366 is left in its normal position, as shown, the governor 340 will operate to increase the pitch on overspeed and decrease the pitch on underspeed by engaging the contact member 346 with members 350 and 348 respectively, thereby rotating the motor 282 in one or the other direction to effect a gain or loss in revolutions between the internal gears 266—268 and so between the miter control gears 190—188 whereby small increments of pitch change put the propeller back on speed.

It will be noted that the coil 308 which engages the clutch for connecting the motor armature 294 to the motor gear-set is energized each time the motor winding is energized whether for one direction of rotation or for the other. Since the spring 306 applies the brake 304 instantly the switch 344 opens, the motor gear-box inertia effect is very small.

It should also be noted that the motor brake 304 is always applied to hold the motor gear-set nonrotative when the jaw clutch 324 is either being engaged or being disengaged, whereby no clashing of the jaws of the clutch 324 ever occurs.

It is further pointed out that while micro-increments of pitch change are preferably made with the motor 282, it may be advantageous, when the propeller is nonrotative and the brakes 270—272 therefore not operative for pitch changing, to make larger pitch changes with the motor although it will require considerably more time.

Attention is directed to the fact that in Figures 1, 2, and 6, the two differential gears are drivably connected to the two control gears, one of the connections including a reversing means, while in Figures 3, 4, and 5, one differential gear only is connected to a control gear and the other to the propeller shaft, one of the connections also being through a reversing means. It will be seen that at least one differential gear must be connected to a control gear, so that variation in differential gear speed, above or below propeller speed, will rotate the control gear with respect to the hub for pitch change. By means of a reversible motor therefor the pitch may be increased or decreased by rotating the same control gear one direction or the other.

While, in all of the several views shown, the braking means is employed for the grosser pitch changes and the elctric motor is utilized for the smaller pitch changes, it will of course be understood that retarding of the control gears may be omitted in a structure in which only the smaller adjustments are desired. Such modified structure is broadly disclosed in my copending application Serial No. 458,039 (see Figure 2 of that application), specific examples only of the structure being included herein.

Having described an embodiment of my invention and several variants thereof, I claim:

1. An adjustable pitch propeller for self-propelled craft comprising a hub, blades having their roots rotatable in said hub about the blade axis, pitch-change gear-sets in said hub rotatable as a unit with said hub, individual gears of said gear sets being rotatable relative to said hub, said gear-sets each including a driven gear on the blade root, two control gears both coaxial with said hub and both rotatable relative thereto, and intermediate gears between the control gears and the driven gears, adapted, upon relative backward rotation of one control gear, with respect to the hub rotation, to rotate the driven gears for pitch increase, and adapted, upon relative backward rotation of the other control gear, with respect to hub rotation to rotate the driven gears for pitch decrease, a differential gear-set comprising two differential gears with axes coincident with the hub axis, a differential carrier normally nonrotative with respect to said craft but rotatable about said coincident axes for effecting pitch change, differential pinions rotatably carried by said differential carrier in mesh with said differential gears, two power transmitting means, each drivably connecting one control gear to one differential gear, a reversing gear set having input and output gears both with axes coincident with the hub axis included in one of said power transmitting means, whereby, upon unitary rotation of both said control gears in the same direction, said differential gears rotate at the same speed in opposite directions when no pitch change is being effected, whereby said differential carrier remains nonrotative with respect to said craft when said control gears rotate as one with said hub, means to retard said differential gears, one at a time, to produce relative backward rotation of one or the other of the control gears with respect to said hub rotation, and means to rotate said differential carrier in one or the other direction with respect to said craft to provide relative rotation in one or the other direction between said control gears and said hub.

2. An adjustable pitch propeller for self-propelled craft comprising a hub, blades having their roots rotatable in said hub about the blade axis, pitch-change gear-sets in said hub rotatable as a unit with said hub, individual gears of said gear-sets being rotatable relative to said hub, said gear-sets each including a driven gear on the blade root, two control gears, both coaxial with said hub and both rotatable relative thereto, and intermediate gears between the control gears and the driven gears, adapted, upon backward rotation of one control gear with respect to the hub rotation, to rotate the driven gear for pitch increase, and adapted, upon backward rotation of the other control gear, with respect to hub rotation, to rotate the driven gear for pitch decrease, means to retard said control gears one at a time to produce relative backward rotation of the retarded control gear with respect to said hub rotation, a differential gear-set comprising two differential gears with axes coincident with the hub axis, a differential carrier normally nonrotative with respect to said craft but rotatable about said hub axis for effecting pitch change, differential pinions rotatably carried by said differential carrier in mesh with said differential gears, two power transmitting means, the first power transmitting means drivably connecting one control gear to one differential gear for unitary rotation, and the second power transmitting means drivably connecting the propeller hub to the other differential gear, a reversing gear set included in said second power transmitting means, having input and output gears with axes coincident with the hub axis whereby, upon unitary rotation of said control gears and said hub in one direction, said differential gears rotate at the same speed in opposite directions when no pitch change is being effected, whereby said differential carrier remains nonrotative with respect to said craft whenever said control gears rotate as one with said hub, and means to rotate said differential carrier in one or the other direction with respect to said craft to provide relative rotation in one or the other direction between said control gears and said hub.

3. In an adjustable pitch propeller for self-propelled craft, a hub, a blade having its route rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said ring gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, a differential gear-set comprising two differential gears with coincident axes, a differential carrier normally nonrotative with respect to said craft but rotatable about said coincident axes for effecting pitch change, differential pinions rotatably carried by said carrier in mesh with said differential gears, power transmitting means operative upon rotation of said hub in one direction for rotation said differential gears in opposite directions when no pitch change in one direction for rotating said differential gears being driven by one of said control gears, whereby said carrier remains nonrotative with respect to said craft when said one control gear rotates as one with said hub, and means to rotate said carrier in one or the other direction with respect to said craft to provide relative rotation in one or the other direction between said control gears and said hub.

4. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said ring gears, a sum gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, means to retard said control gears, one at a time to produce relative backward rotation of the retarded control gear with respect to said hub rotation, a differential gear-set comprising two differential gears with coincident axes, a differential carrier normally nonrotative with respect to said craft but rotatable about said coincident axes for effecting pitch change, differential pinions rotatably carried by said carrier in mesh with said differential gears, power transmitting means operative upon rotation of said hub in one direction for rotating said differential gears in opposite directions when no pitch change is being effected, at least one of said differential gears being driven by one of said control gears, whereby said carrier remains nonrotative with respect to said craft when said one control gear rotates as one with said hub, and means to rotate said carrier in one or the other direction with respect to said craft to provide relative rotation in one or the other direction between said control gears and said hub.

5. In an adjustable pitch propeller for a self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said ring gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, a differential gear-set comprising two differential gears with coincident axes, a differential carrier normally nonrotative with respect to said craft but rotatable about said coincident axes for effecting pitch change, differential pinions rotatably carried by said differential carrier in mesh with said differential gears, two power transmitting means, each connecting one control gear to one differential gear, operative upon rotation of both said control gears in the same direction for rotating said differential gears in opposite directions when no pitch change is being effected, whereby said differential carrier remains nonrotative with respect to said craft when said control gears rotate as one with said hub, and means to rotate said differential carrier in one or the other direction with respect to said craft to provide relative rotation in one or the other direction between said control gears and said hub.

6. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said ring gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, means to retard said control gears, one at a time, to produce relative backward rotation of the retarded control gear with respect to said hub rotation, a differential gear-set comprising two differential gears with coincident axes, a differential carrier normally rotative with respect to said craft but rotatable about said coincident axes for effecting pitch change, differential pinions rotatably carried by said differential carrier in mesh with said differential gears, two power transmitting means, each connecting one control gear to one differential gear, operative upon rotation of both said control gears in the same direction for rotating said differential gears in opposite directions when no pitch change is being effected, whereby said differential carrier remains nonrotative with respect to said craft when said control gears rotate as one with said hub, and means to rotate said differential carrier in one or the other direction with respect to said craft to provide relative rotation in one or the other direction between said control gears and said hub.

7. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said ring gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, a differential gear-set comprising two differential gears with coincident axes, a differential carrier normally nonrotative with respect to said craft but rotatable about said coincident axes for effecting pitch change, differential pinions rotatably carried by said differential carrier in mesh with said differential gears, two power transmitting means, each drivably connecting one control gear to one differential gear, a reversing gear included in one of said power transmitting means, whereby, upon unitary rotation of both said control gears in the same direction, said differential gears rotate at the same speed in opposite directions when no pitch change is being effected, whereby said differential carrier remains nonrotative with respect to said craft when said control gears rotate as one with said hub, and means to rotate said differential carrier in one or the other direction with respect to said craft to provide relative rotation in one or the other direction between said control gears and said hub.

8. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said ring gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, means to retard said control gears, one at a time, to produce relative backward rotation of the retarded control gear with respect to said hub rotation, a differential gear-set comprising two differential gears with coincident axes, a differential carrier normally nonrotative with respect to said craft but rotatable about said coincident axes for effecting pitch change, differential pinions rotatably carried by said differential carrier in mesh with said differential gears, two power transmitting means, each drivably connecting one control gear to one differential gear, a reversing gear included in one of said power transmitting means, whereby, upon unitary rotation of both said control gears in the same direction, said differential gears rotate at the same speed in opposite directions when no pitch change is being effected, whereby said differential carrier remains nonrotative with respect to said craft when said control gears rotate as one with said hub, and means to rotate said differential carrier in one or the other direction with respect to said craft to provide relative rotation in one or the other direction between said control gears and said hub.

9. In an adjustable pitch propeller for self-propelled craft, a hub, a blade having its root rotatable in said hub about the blade axis, a pitch change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, a coaxial bevel control gear in mesh with the first said bevel gear, adapted upon relative rotation of said control gear in one direction with respect to the hub rotation, to rotate the driven gear for pitch increase, and adapted upon relative rotation of the control gear in the other direction with respect to hub rotation, to rotate the driven gear for pitch decrease, a differential gear-set comprising two differential gears with coincident axes, a differential carrier normally nonrotative with respect to said craft but rotatable about said coincident axes for effecting pitch change, differential pinions rotatably carried by said differential carrier in mesh with said differential gears, two power transmitting means, one of said power transmitting means drivably connecting said control gear to one differential gear for unitary rotation, and the second of said power transmitting means drivably connecting the propeller hub to the other differential gear, a reversing gear being included in one of said power transmitting means, whereby, upon unitary rotation of said control gear and said hub in one direction, said differential gears rotate at the same speed in opposite directions when no pitch change is being effected, whereby said differential carrier remains nonrotative with respect to said craft whenever said control gear rotates as one with said hub, and means to rotate said differential carrier in one or the other direction with respect to said craft to provide relative rotation in one or the other direction between said control gear and said hub.

10. In an adjustable pitch propeller for self-propelled craft, a hub, a blade having its root rotatable in said hub about the blade axis, a pitch change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, means to retard said control gears, one at a time, to produce relative backward rotation of the retarded control gear with respect to said hub rotation, a differential gear-set comprising two differential gears with coincident axes, a differential carrier normally nonrotative with respect to said craft but rotatable about said coincident axes for effecting pitch change, differential pinions rotatably carried by said differential carrier in mesh with said differential gears, two power transmitting means, one of said power transmitting means drivably connecting one control gear to one differential gear for unitary rotation, and the second of said power transmitting means drivably connecting the propeller hub to the other differential gear, a reversing gear being included in one of said power transmitting means, whereby, upon unitary rotation of said control gears and said hub in one direction, said differential gears rotate at the same speed in opposite directions when no pitch change is being effected, whereby said differential carrier remains nonrotative with respect to said craft whenever said one control gear rotates as one with said hub, and means to rotate said differential carrier in one or the other direction with respect to said craft to provide relative rotation in one or the other direction between said control gears and said hub.

11. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, a bevel control gear coaxial with said hub in mesh with the first said bevel gear, adapted upon relative rotation of said control gear in one direction with respect to the hub rotation, to rotate the driven gear for pitch increase, and adapted upon relative rotation of the control gear in the other direction with respect to hub rotation, to rotate the driven gear for pitch decrease, a differential gear-set comprising two differential gears with coincident axes, a differential carrier normally nonrotative with respect to said craft but rotatable about said coincident axes for effecting pitch change, differential pinions rotatably carried by said differential carrier in mesh with said differential gears, two power transmitting means, one of said power transmitting means drivably connecting said control gear to one differential gear for unitary rotation, and the second of said power transmitting means drivably connecting the propeller hub to the other differential gear, a reversing gear being included in said second power transmitting means, whereby, upon unitary rotation of said control gear and said hub in one direction, said differential gears rotate at the same speed in opposite directions when no pitch change is being effected, whereby said differential carrier remains nonrotative with respect to said craft whenever said control gear rotates as one with said hub, and means to rotate said differential carrier in one or the other direction with respect to said craft to provide relative rotation in one or the other direction between said control gear and said hub.

12. In an adjustable pitch propeller for self-propelled craft, a hub, a blade having its root rotatable in said hub about the blade axis, a pitch-change gear-set in said hub rotatable as a unit with said hub, said gear-set comprising, an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, means to retard said control gears, one at a time, to produce relative backward rotation of the retarded control gear with respect to said hub rotation, a differential gear-set comprising two differential gears with coincident axes, a differential carrier normally rotative with respect to said craft but rotatable about said coincident axes for effecting pitch change, differential pinions rotatably carried by said differential carrier in mesh with said differential gears, two power transmitting means, one of said power transmitting means drivably connecting one control gear to one differential gear for unitary rotation, and the second of said power transmitting means drivably connecting the propeller hub to the other differential gear, a reversing gear being included in said second power transmitting means, whereby, upon unitary rotation of said control gears and said hub in one direction, said differential gears rotate at the same speed in opposite directions when no pitch change is being effected, whereby said differential carrier remains nonrotative with respect to said craft whenever said one control gear rotates as one with said hub, and means to rotate said differential carrier in one or the other direction with respect to said craft to provide relative rotation in one or the other direction between said control gears and said hub.

13. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, a bevel control gear coaxial with said hub in mesh with the first said bevel gear, adapted upon relative rotation of said control gear in one direction with respect to the hub rotation, to rotate the driven gear for pitch increase, and adapted, upon relative rotation of the control gear in the other direction with respect to hub rotation, to rotate the driven gear for pitch decrease, a differential gear-set comprising two differential gears with coincident axes, a differential carrier normally non-rotative with respect to said craft but rotatable about said coincident axes for effecting pitch change, differential pinions rotatably carried by said differential carrier in mesh with said differential gears, two power transmitting means, the first of said power transmitting means drivably connecting said control gear to one differential gear for unitary rotation, and the second of said power transmitting means drivably connecting the propeller hub to the other differential gear, a reversing gear being included in said first power transmitting means, whereby, upon unitary rotation of said control gear and said hub in one direction, said differential gears rotate at the same speed in opposite directions when no pitch change is being effected, whereby said differential carrier remains nonrotative with respect to said craft whenever said control gear rotates as one with said hub, and means to rotate said differential carrier in one or the other direction with respect to said craft to provide relative rotation in one or the other direction between said control gear and said hub.

14. In an adjustable pitch propeller for self-propelled craft, a hub, a blade having its root rotatable in said hub about the blade axis, a pitch-change gear-set in said hub rotatable as a unit with said hub, said gear-set comprising, an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, means to retard said control gears, one at a time, to produce relative backward rotation of the retarded control gear with respect to said hub rotation, a differential gear-set comprising two differential gears with coincident axes, a differential carrier normally nonrotative with respect to said craft but rotatable about said coincident axes for effecting pitch change, differential pinions rotatably carried by said differential carrier in mesh with said differential gears, two power transmitting means, the first of said power transmitting means drivably connecting one control gear to one differential gear for unitary rotation, and the second of said power transmitting means drivably connecting the propeller hub to the other differential gear, a reversing gear being included in said first power transmitting means, whereby, upon unitary rotation of said control gears and said hub in one direction, said differential gears rotate at the same speed in opposite directions when no pitch change is being effected, whereby said differential carrier remains nonrotative with respect to said craft whenever said one control gear rotates as one with said hub, and means to rotate said differential carrier in one or the other direction with respect to said craft to provide relative rotation in one or the other direction between said control gears and said hub.

15. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, a bevel control gear in mesh with the first said bevel gear, adapted upon relative rotation of said control gear in one direction with respect to the hub rotation, to rotate the driven gear for pitch increase, and adapted upon relative rotation of the said control gear in the other direction with respect to hub rotation, to rotate the driven gear for pitch decrease, a differential gear-set comprising two differential gears with axis common with the control gear axis, the first of said differential gears being drivably connected to said control gear, a differential carrier normally nonrotative with respect to said craft but rotatable about said common axis for effecting pitch change, differential pinions rotatably carried by said differential carrier in mesh with both of said differential gears, a reversing gear train of which the first reversing gear and last reversing gear rotate in opposite directions, the first reversing gear being drivably connected to the hub, and the last reversing gear being drivably connected to the second differential gear, and means to rotate said differential carrier in either direction with respect to said craft.

16. In an adjustable pitch propeller for self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, two coaxial bevel control gears in mesh with the first said bevel gear, adapted upon relative backward rotation of one control gear with respect to the hub rotation, to rotate the driven gear for pitch increase, and adapted upon relative backward rotation of the other control gear with respect to hub rotation, to rotate the driven gear for pitch decrease, means to retard said control gears, one at a time, to produce relative backward rotation of the retarded control gear with respect to said hub rotation, a differential gear-set comprising two differential gears with axis common with the control gear axis, the first of the two differential gears being drivably connected to one of said control gears, a differential carrier normally nonrotative with respect to said craft but rotatable about said common axis for effecting pitch change, differential pinions rotatably carried by said differential carrier in mesh with both of said differential gears, a reversing gear train of which the first reversing gear and last reversing gear rotate in opposite directions, the first reversing gear being drivably connected to the hub, and the last being drivably connected to the second differential gear, and means to rotate said differential carrier in either direction with respect to said craft.

17. In an adjustable pitch propeller for a self-propelled craft, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, two bevel control gears, both coaxial with said hub, in mesh with the first said bevel gear, adapted upon rotation, the one in the same direction and the other opposite in direction to the hub rotation, to rotate the driven gear for pitch increase, and adapted, upon rotation, each opposite the first said directions to rotate the driven gear for pitch decrease, a differential gear-set comprising two differential gears with axes common with the control gear axis, a differential pinion carrier normally nonrotative with respect to said craft but rotatable about said common axis for effecting pitch change, differential pinions rotatably carried by said differential pinion carrier in mesh with said differential gears, a reversing gear-set the first and last gears of which rotate at equal speeds and in opposite directions when no pitch change is being effected and are respectively connected to one control gear and one differential gear, means connecting the other control gear to the other differential gear for unitary rotation, and means to rotate said differential carrier in either direction with respect to said craft.

18. In an adjustable pitch propeller, a hub, a blade having its root rotatable in said hub about the blade axis, a pitch-change gear-set in said hub rotatable as a unit with said hub, said gear-set comprising an internally toothed reaction gear fast in said hub and held against rotation with respect thereto, an internally toothed driven gear within said hub secured to said blade root to be driven therewith, a planet pinion, a planet pinion carrier for said pinion rotatable in said blade root and revolvably supporting said pinion in mesh with both said internally toothed gears, a sun gear rotatably supported in said carrier in mesh with said pinions, a bevel driving gear secured to said sun gear for unitary rotation therewith, two bevel control gears, both coaxial with said hub, in mesh with the first said bevel gear, adapted upon rotation, the one in the same direction and the other opposite in direction to the hub rotation, to rotate the driven gear for pitch increase, and adapted, upon rotation, each opposite the first said directions to rotate the driven gear for pitch decrease, a differential gear-set comprising two differential gears with axes common with the control gear axis, a differential pinion carrier rotatable about said common axis, differential pinions rotatably carried by said differential pinion carrier in mesh with said differential gears, a reversing gear-set, the first and last gears of which rotate at equal speeds and in opposite directions and are respectively connected to one control gear and one differential gear, means connecting the other control gear to the other differential gear for unitary rotation, a brake element attached to each differential gear for unitary rotation therewith, braking means for arresting rotation of said elements one at a time, and means to rotate said differential carrier in either direction.

19. An adjustable pitch propeller comprising a hub, a blade having its inner end rotatable in said hub about the axis of the blade, a pitch-change gear-set in said hub rotatable as a unit with said hub, individual gears of said gear-set being rotatable relative to said hub, said gear-set including a driven gear on said inner end, two control gears, and intermediate gears between the control gears and the driven gear, adapted, upon relative backward rotation of one control gear, with respect to the hub rotation, to rotate the driven gear for pitch increase, and adapted, upon relative backward rotation of the other control gear, with respect to hub rotation, to rotate the driven gear for pitch decrease, electrically controlled braking means to retard said control gears, one at a time, to produce relative backward rotation of the retarded control gear with respect to said hub rotation, a differential gear-set comprising two differential gears with a common axis, a differential carrier rotatable about said common axis, differential pinions rotatably carried by said differential carrier in mesh with said differential gears, power transmitting means operative by rotation of said hub in one direction to rotate said differential gears in opposite directions, at least one of said differential gears being driven by one of said control gears, whereby said differential carrier remains nonrotative when said one control gear rotates as one with said hub, a reversible electric motor to rotate said differential carrier in one or the other direction to provide relative rotation in one or the other direction between said control gears and said hub, speed-reducing mechanism associated with said motor, including a low-speed shaft, a low-speed gear, clutch means drivably connecting said low-speed gear to said low-speed shaft, and electromagnetic means for disengaging said clutch, a current source, and a manual switch operable to one position to series connect one of said electrically controlled braking means and said electromagnetic means to said current source, and operable to another position to series connect the other of said electrically controlled braking means and said electromagnetic means to said current source.

20. An adjustable pitch propeller comprising a hub, a blade having its inner end rotatable in said hub about the axis of the blade, a pitch-change gear-set in said hub rotatable as a unit with said hub, individual gears of said gear-set being rotatable relative to said hub, said gear-set including a driven gear on said inner end, two control gears, and intermediate gears between the control gears and the driven gear, adapted, upon relative backward rotation of one control gear, with respect to the hub rotation, to rotate the driven gear for pitch increase, and adapted, upon relative backward rotation of the other control gear, with respect to hub rotation, to rotate the driven gear for pitch decrease, electrically controlled braking means to retard said control gears, one at a time, to produce relative backward rotation of the retarded control gear with respect to said hub rotation, a differential gear-set comprising two differential gears with a common axis, a differential carrier rotatable about said common axis, differential pinions rotatably carried by said differential carrier in mesh with said differential gears, power transmitting means operative by rotation of said hub in one direction to rotate said differential gears in opposite directions, at least one of said differential gears being driven by one of said control gears, whereby said differential carrier remains nonrotative when said one control gear rotates as one with said hub, a reversible electric motor to rotate said differential carrier in one or the other direction to provide relative rotation in one or the other direction between said control gears and said hub, speed reducing mechanism associated with said reversible motor, including a low-speed shaft, a low-speed gear, clutch means drivably connecting said low-speed gear to said low-speed shaft, and electromagnetic means for disengaging said clutch, a current source, a manual switch operable to one position to provide a series circuit through one of said electrically controlled braking means, said electromagnetic means and said current source, and operable to another position to provide a series circuit through the other of said electrically controlled braking means, said electromagnetic means and said current source, a pitch-change-sensitive device drivable by said low speed shaft in one or the other direction upon pitch increase or decrease, and pitch-change-limiting switches, one in each said circuit, positioned in the path of said pitch-change-sensitive device so as to be opened thereby at a predetermined pitch increase or decrease.

21. An adjustable pitch propeller comprising a hub, a blade having its inner end rotatable in said hub about the axis of the blade, a pitch-change gear-set in said hub rotatable as a unit with said hub, individual gears of said gear-set being rotatable relative to said hub, said gear-set including a driven gear on said inner end, two control gears, and intermediate gears between the control gears and the driven gear, adapted, upon relative backward rotation of one control gear, with respect to the hub rotation, to rotate the driven gear for pitch increase, and adapted, upon relative backward rotation of the other control gear, with respect to hub rotation, to rotate the driven gear for pitch decrease, electrically controlled braking means to retard said control gears, one at a time, to produce relative backward rotation of the retarded control gear with respect to said hub rotation, a differential gear-set comprising two differential gears with a common axis, a differential carrier rotatable about said common axis, differential pinions rotatably carried by said differential carrier in mesh with said differential gears, power transmitting means operative by rotation of said hub in one direction to rotate said differential gears in opposite directions, at least one of said differential gears being driven by one of said control gears, whereby said differential carrier remains nonrotative when said one control gear rotates as one with said hub, a reversible electric motor having two winding paths, adapted to rotate said differential carrier in one or the other direction to provide relative rotation in one or the other direction between said control gears and said hub, speed reducing mechanism associated with said reversible motor, including a low-speed shaft, a low-speed gear, clutch means drivably connecting said low-speed gear to said low-speed shaft, and electromagnetic means for disengaging said clutch, a current source, a manual switch operable to one position to provide a series circuit through one of said electrically controlled braking means, said electromagnetic means, and said current source, and operable to another position to provide a series circuit through the other of said electrically controlled braking means, said electromagnetic means and said current source, a speed-responsive switch operable to one position to provide a circuit through one winding path and said current source, and operable to another position to provide a circuit through the other winding path and said current source, a pitch-change-sensitive device, drivable by said low-speed shaft in one or the other direction upon pitch increase or decrease, and pitch-change-limiting switches, one in each said circuit, positioned in the path of said pitch-change-sensitive device so as to be opened thereby at a predetermined pitch increase or decrease.

22. An adjustable pitch propeller having a positive and a negative pitch range, which comprises a hub, a blade having its inner end rotatable in said hub about the axis of the blade, a pitch-change gear-set in said hub rotatable as a unit with said hub, individual gears of said gear-set being rotatable relative to said hub, said gear-set including a driven gear on said inner end, two control gears, and intermediate gears between the control gears and the driven gear, adapted, upon relative backward rotation of one control gear, with respect to the hub rotation, to rotate the driven gear for pitch increase, and adapted, upon relative backward rotation of the other control gear, with respect to hub rotation, to rotate the driven gear for pitch decrease, electrically controlled braking means to retard said control gears, one at a time, to produce relative backward rotation of the retarded control gear with respect to said hub rotation, a differential gear-set comprising two differential gears with a common axis, a differential carrier rotatable about said common axis, differential pinions rotatably carried by said differential carrier in mesh with said differential gears, power transmitting means operative by rotation of said hub in one direction to rotate said differential gears in opposite directions, at least one of said differential gears being driven by one of said control gears, whereby said differential carrier remains nonrotative when said one control gear rotates as one with said hub, a reversible electric motor having two paths through its winding, adapted to rotate said differential carrier in one or the other direction to provide relative rotation in one or the other direction between said control gears and said hub to increase or decrease the pitch, speed-reducing mechanism associated with said reversible motor, including a low-speed shaft, a low-speed gear, clutch means drivably connecting said low-speed gear to said low-speed shaft, and electromagnetic means for disengaging said clutch means, a current source, a manual switch operable to one position to provide a series circuit through one of said electrically controlled braking means, said electromagnetic means, and said current source, and operable to another position to provide a series circuit through the other of said electrically controlled braking means, said electromagnetic means and said current source, a pitch-change-sensitive device, drivable by said low-speed shaft in one or the other direction upon pitch increase or decrease, a speed-responsive switch operative upon a rise or drop in speed to respectively direct current from the current source through the pitch-increase or pitch-decrease paths of the motor, and a reverse switching means operative by movement of said pitch-change-sensitive device into the negative pitch range to reverse the motor paths so that a drop in speed operates the motor for pitch increase and a rise in speed operates the motor for pitch decrease.

HOWARD M. McCOY.